United States Patent [19]
Jacob et al.

[11] Patent Number: 5,627,304
[45] Date of Patent: May 6, 1997

[54] SYSTEM FOR AUTOMATIC REAL-TIME CALIBRATION OF REMOTELY-LOCATED CAPACITIVE-TYPE FUEL QUANTITY MEASUREMENT PROBES

[75] Inventors: Neil R. Jacob, Largo; Joe K. Winner; Douglas C. Smythe, both of Clearwater, all of Fla.

[73] Assignee: Smiths Industries, Florham Park, N.J.

[21] Appl. No.: 247,239

[22] Filed: May 23, 1994

[51] Int. Cl.⁶ .................................................. G01F 25/00
[52] U.S. Cl. ............................................. 73/1.73; 73/304 C
[58] Field of Search ................................ 73/1 H, 304 C; 324/686, 690; 390/620

[56] References Cited

U.S. PATENT DOCUMENTS

| | | | |
|---|---|---|---|
| 3,827,300 | 8/1974 | Thaler | 73/304 C |
| 4,020,691 | 5/1977 | Franklin | 73/304 C |
| 4,214,479 | 7/1980 | Maier | 73/304 C |
| 4,281,542 | 8/1981 | Wallman | 73/304 C |
| 4,347,741 | 9/1982 | Geiger | 73/304 C |
| 4,472,968 | 9/1984 | Coates | 73/304 C |
| 4,526,027 | 7/1985 | Franklin | 73/1 H |
| 4,638,305 | 1/1987 | Sutton | 340/620 |
| 4,676,101 | 6/1987 | Baughman | 73/304 C |
| 4,866,640 | 9/1989 | Morrison, Jr. | 364/558 |
| 4,914,377 | 4/1990 | Russell | 324/690 |
| 4,968,946 | 11/1990 | Maier | 324/671 |
| 4,977,786 | 12/1990 | Davis | 73/864.24 |
| 5,089,783 | 2/1992 | Kapsokavathis et al. | 324/672 |
| 5,233,875 | 8/1993 | Obermeier et al. | 73/718 |

Primary Examiner—Richard Chilcot
Assistant Examiner—Paul D. Amrozowicz
Attorney, Agent, or Firm—Varnum, Riddering, Schmidt & Howlett

[57] ABSTRACT

A system including a method and means for trimming capacitive-type remotely-located fuel probes that eliminates the previously-used variable trim capacitor and substitutes a rugged, inexpensive, standard-value signature resistor connected between the AC input and ground to provide "calibration offset" data needed by the fuel measurement electronics to make a determination of actual probe capacitance. The system may be applied to any such probe having a blocking capacitor in series with the probe capacitor, which blocking capacitor insures accurate measurement of the signature resistor when the leakage resistance is significant. When applied to DC or AC FHC probes, the $C_{fhc}$ capacitor is replaced with a non-critical DC-blocking capacitor, that is typically at least 100 times greater in capacitance value than the $C_{probe}$ capacitor, and then a software modeled FHC algorithm may be used along with the signature resistor value, which acts as a pointer to a lookup table, to provide accurate, real-time calibration of the probe.

2 Claims, 2 Drawing Sheets

SYSTEM FOR AUTOMATIC REAL-TIME CALIBRATION OF REMOTELY-LOCATED CAPACITIVE-TYPE FUEL QUANTITY MEASUREMENT PROBES

BACKGROUND OF THE INVENTION

1. Field of the Invention

The present invention relates to capacitive-type fuel quantity measurement probes and more particularly to a method and means for automatic real-time calibration of remotely-located fuel quantity measurement probes of the capacitive type.

2. Problem to be Solved

Capacitive-type fuel quantity measurement probes are typically constructed using two or more concentrically arranged aluminum cylinders that act as capacitor electrodes. Fuel is disposed between the electrodes and the fuel quantity is determined by measuring changes in the probe capacitance. The capacitance changes are proportional to the fuel level present and the dielectric properties of the fuel. Currently, there is an increasing demand for high-accuracy fuel quantity measurement systems, e.g., +/−0.75% of full scale system accuracy at empty, along with the requirement that each component of the system, e.g., probes, fuel quantity measurement electronics, and harnesses, be fully interchangeable and not require calibration or adjustment when installed on a vehicle such as an aircraft.

Since manufacturing tolerances for aluminum cylinders and associated insulating spacers and terminal blocks used in probe construction typically introduce an error of 1% or more in the expected probe "dry" capacitance, to guarantee interchangeability with all other components of the system each probe must be individually factory-trimmed after manufacture to a tight tolerance, e.g., +/−0.2%.

Prior Art

The conventional solution to probe trimming is to add a small variable trimmer capacitor in parallel with the probe electrodes and adjust it to a pre-set, "total padded" capacitance design value. For example, a 47.0 pF probe with a +/−0.5 pF manufacturing tolerance is padded with a 1.0 - to - 5.0 pF variable trim capacitor that is adjusted so that the combined probe/trim capacitance always equals a "total padded" value of 50.0 pF.

A typical DC probe for fuel measurements is shown in the schematic of FIG. 1a if the capacitor $C_{fhc}$ is ignored. The $C_{probe}$ capacitor has a parallel leak resistor $R_{leak}$ and is excited by an AC waveform, e.g., a 30 KHz sine wave at 15 volts peak, input on line 10. Changes in probe capacitance correspond to changes of fuel level and fuel dielectric constant on the $C_{probe}$ capacitor. The output current from $C_{probe}$ is rectified by a reverse-biased diode $D_1$ and a forward-biased diode $D_2$ to provide a pulsating negative DC current "return" signal back to the remotely-located probe measurement electronics 30 on output lines 11 and 12. Conversely, diode polarity of $D_1$ and $D_2$ can be reversed in common practice with a resultant positive DC current on output lines 11 and 12. A capacitor $C_{trim}$ is added in parallel with $C_{probe}$ to allow adjustment to the final "total padded" capacitance required.

A typical DC probe can be converted to a DC FHC (Full-Height-Compensated)-style probe as shown in FIG. 1a by including the $C_{fhc}$ capacitor coupled in series with $C_{probe}$ to provide fuel density correction over the full wetted length of the probe in conjunction with an inverse-FHC physically-tapered inner electrode. The DC FHC probe assembly may be trimmed to a final "total padded" capacitance by the $C_{trim}$ capacitor which is connected in parallel with the $C_{fhc}$ and $C_{probe}$ network. The physical $C_{fhc}$ capacitor may be modeled in software ("software FHC"), if desired, eliminating the need for a physical component.

Equivalent AC versions of the DC probe elements can also be constructed by replacing the diodes $D_1$ and $D_2$ with a shielded coaxial cable having a center conductor 12 and a shield wire 11 as shown in FIG. 1b. The shielded coaxial cable (11, 12) between the probe assembly and remote measurement electronics 30 may be any convenient length, such as 30 feet.

In all probe embodiments, the $R_{leak}$ resistor represents the resistive component that is effectively in parallel with $C_{probe}$ due to water, algae, fuel contamination, or conductive additives in the fuel. Since $R_{leak}$ creates an undesirable error source, remotely-located fuel measurement circuitry is used to "flag" a condition where $R_{leak}$ appreciably effects accuracy. A typical technique involves switching the probe excitation frequency from "F" to "2F" and observing that the reactive component ($C_{probe}$) doubles in current, while $R_{leak}$ remains constant. In so doing, the $R_{leak}$ component may be effectively detected.

The disadvantages of the conventional trimming approach include:

Variable trim capacitors are fragile, expensive, and may shift in value when potted;

Potting and complete sealing of the trimmer capacitor is a requirement if the capacitor is located in an area subject to fuel intrusion;

The trimming process is tedious, as a small trimmer must be adjusted in the factory by a technician while watching a precision capacitance meter, and interactive trim/retrim sequences may be needed, as stray capacitances may change when a screwdriver is inserted or removed from the trimmer area; and The capacitance trim value may shift after manufacture due to vibration, aging, or fuel contamination effects.

Objects

It is therefore an object of the present invention to provide a quick, permanent calibration system for each raw manufactured capacitive-type remotely located fuel probe.

It is another object of the invention to achieve trim accuracies of +/−0.1 pF or better in capacitive-type fuel probes.

It is a further object to achieve such trim accuracies with no shift in trim value due to vibration, aging, or fuel contamination effects.

It is a particular object to achieve the foregoing improved calibration and trim accuracies by merely using a single, inexpensive fixed "signature resistor" and a fixed, non-critical DC blocking capacitor.

SUMMARY OF THE INVENTION

The present invention involves a system including a method and means for trimming capacitive-type remotely located fuel probes, which system eliminates the need for the previously-used variable trim capacitor in the probe and substitutes a rugged, inexpensive, standard-value resistor (signature resistor) connected between the AC input and ground to provide "calibration offset" data needed by the fuel measurement electronics to make a determination of actual probe capacitance. In practice, each raw manufactured probe is quickly measured once with a capacitance meter and the probe's deviation from nominal, i.e., offset in pF, is then used to select a corresponding standard-value resistor. This signature resistor represents the offset in pF from nominal for each particular probe and becomes a permanent part of the probe assembly. During fuel measurement, the signature resistor is measured and used to add or subtract a "calibration offset" from the measured probe capacitance. With this approach, the actual trim offset value of probe capacitance can be determined to an accuracy of 0.1 pF or better, depending on the number of resolvable, standard resistance values employed and the range of offset correction needed.

The invention may accordingly be applied to any such capacitive probe by including a signature resistor in parallel with the probe capacitor, between the probe input and the signal return line, and selectively including a blocking capacitor in series with the probe capacitor, which blocking capacitor insures accurate measurement of the signature resistor when the leakage resistance is significant. When applied to DC FHC probes, the $C_{fhc}$ capacitor is replaced with a non-critical DC-blocking capacitor, that is typically at least 100 times greater in capacitance value than the $C_{probe}$ capacitor, and then a software modeled FHC algorithm may be used along with the signature resistor value, which acts as a pointer to a lookup table, to provide accurate, real-time calibration of the probe.

BRIEF DESCRIPTION OF THE DRAWINGS

FIG. 1b is a schematic diagram of an equivalent AC FHC probe circuit version of the prior art circuit of FIG. 1a.

DETAILED DESCRIPTION OF THE PREFERRED EMBODIMENT

Figure 1A:
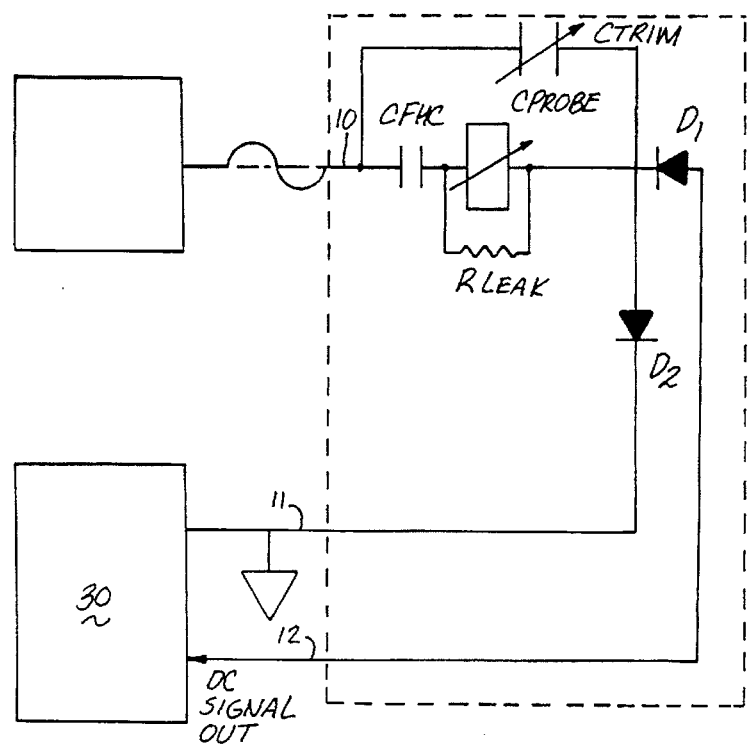
FIG. 1a is a schematic diagram of a typical DC FHC probe circuit in keeping with the prior art.
Figure 2A:
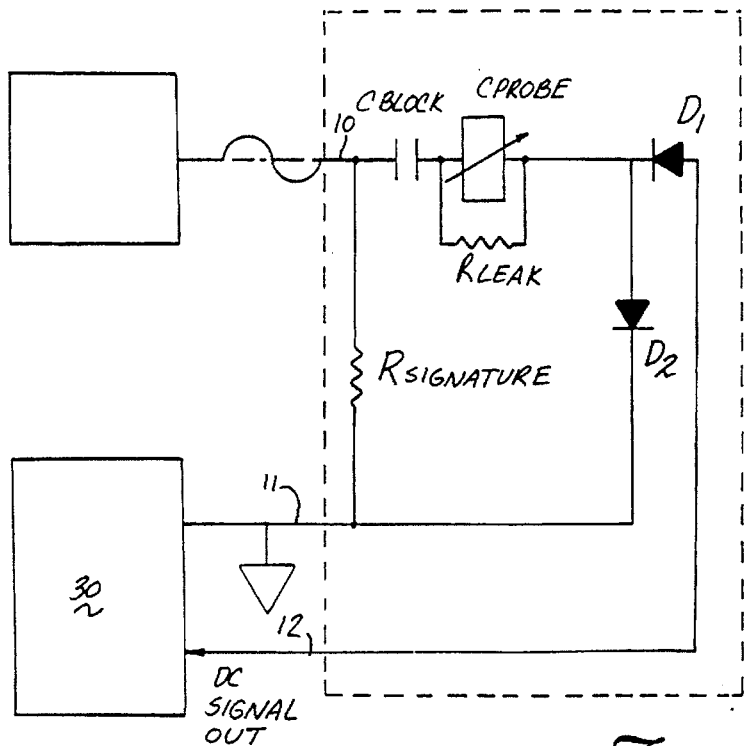
FIG. 2 is a schematic diagram of a DC probe circuit in accordance with the present invention.
FIG. 2b is a schematic diagram of an AC probe circuit in accordance with the present invention.
Figure 1B:
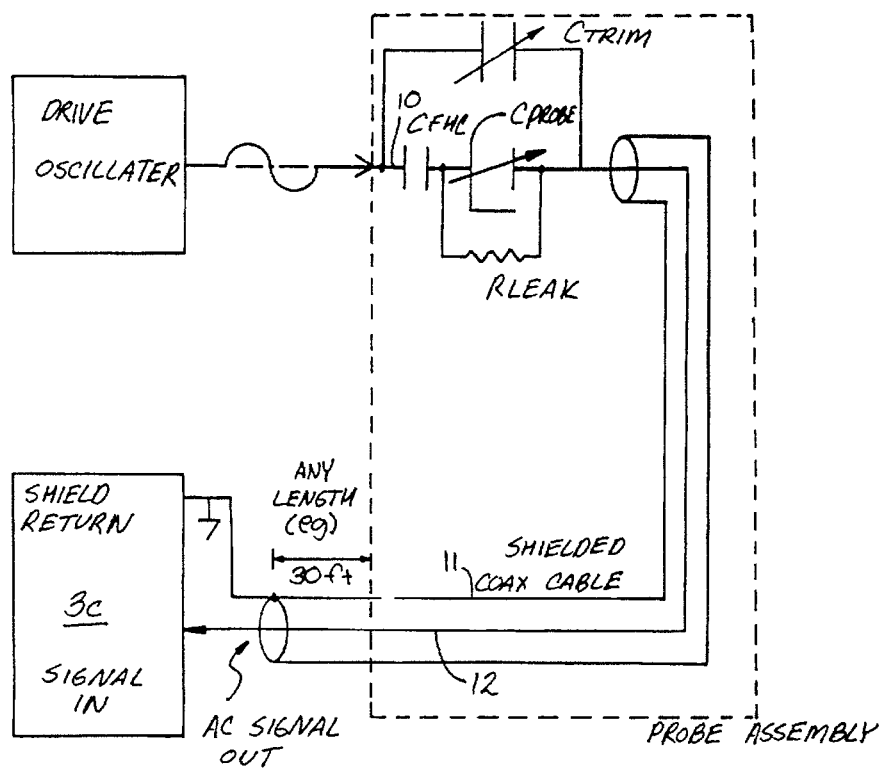
Figure 2B:
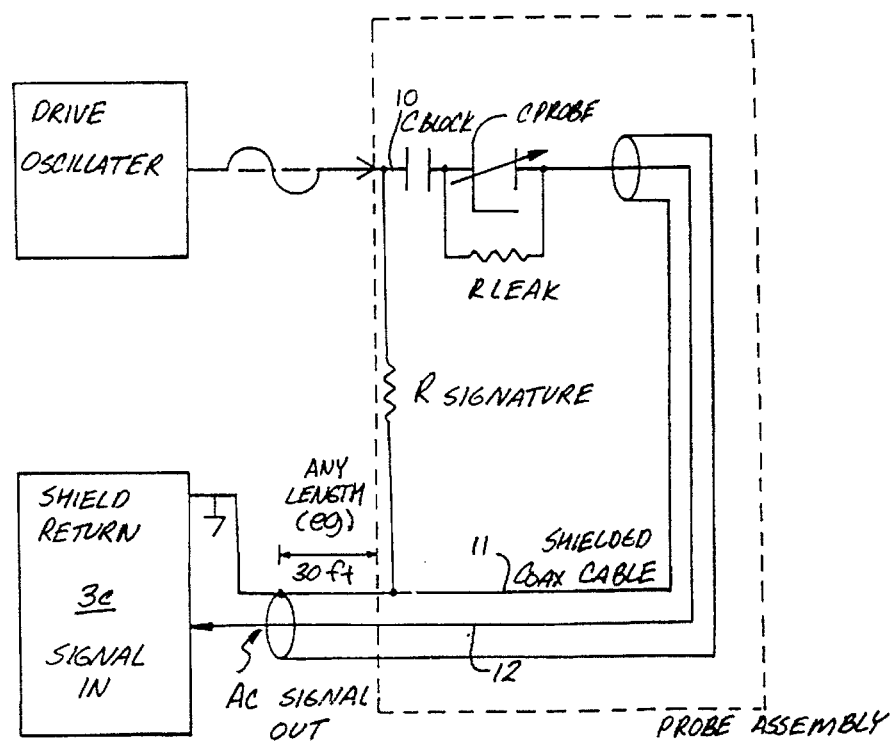

The system of the present invention involves a probe circuit having a DC version, such as shown in FIG. 2a, and an AC version, as shown in FIG. 2b. As in the prior art circuits of FIG. 1a and 1b, the $C_{probe}$ capacitor has a parallel leak resistor $R_{leak}$ and is excited by an AC waveform, e.g., a 30 KHz sine wave at 15 volts peak, input on line 10. The $R_{leak}$ resistor represents the resistive component that is effectively in parallel with $C_{probe}$ due to water, algae, fuel contamination, or conductive additives in the fuel. Changes in probe capacitance correspond to changes in the fuel level and fuel dielectric constant on the $C_{probe}$ capacitor. The output current from $C_{probe}$ provides a "return" signal, which, in the case of DC or DC FHC probes, is first rectified by diodes $D_1$ and $D_2$ back to the remotely-located probe measurement electronics 30 on prior art DC probe circuit in FIG. 1, that a resistor $R_{signature}$ and output lines 11 and 12. It will be seen, upon referring to the a capacitor $C_{block}$ have been added to the circuit of FIGS. 2a and 2b in place of $C_{trim}$, to provide probe "offset calibration".

$R_{signature}$ is connected between input line 10 and ground line 11 and may be a rugged, inexpensive, standard-value resistor. It provides "calibration offset" data needed by the fuel measurement electronics to make a determination of actual probe capacitance. For calibration purposes, when the raw manufactured probe is assembled, its capacitance is quickly measured once with a capacitance meter. The probe's deviation from its nominal value, that is, its offset in pF, is noted and then used to select a corresponding, fixed, standard-value resistor as the signature resistor Rsignature. This resistor represents the offset in pF from the nominal value of the particular probe in which it is installed and becomes a permanent part of the probe assembly.

During fuel measurement, $R_{signature}$ is measured and used to add or subtract a "calibration offset" from the measured probe capacitance. More particularly, the value of $R_{signature}$ is measured by the remotely-located fuel quantity measurement electronics 30, using, for example, a simple voltage divider principle, with an analog-to-digital converter or similar device, as will be within the purview of those of skill in the art. The value of $R_{signature}$, when determined, is then used with suitable straightforward software as a pointer to a "lookup table" in a manner, for example, such as follows:

| $R_{signature}$ Value | Meaning to Software |
|---|---|
| 100K ohms | Subtract 0.1 pF from measured probe capac. |
| 110K ohms | Measured probe value = nominal design value |
| 120K ohms | Add 0.1 pF to measured probe capacitance |

In practice, a much larger number of resolvable resistor values can be employed. For example, there are 30 discrete, standard 1% resistor values over the 100K ohm to 200K ohm octave range, that could represent a probe adjustment range of +/−0.75 pF, in trim increments of +/−0.05 pF. This offers a very broad range of selection. The only restriction on the minimum value of $R_{signature}$ is the drive capability of the probe excitation oscillator source inputting the AC voltage on line 10. For example, 100K is a "safe" minimum value for almost any oscillator source. The maximum value of $R_{signature}$ is limited by system noise and by possible erroneous measurements of its resistance due to cable insulation resistance, although cable resistance is typically on the order of 100's or 1000's of megohms. Using this technique, the actual trim offset value of probe capacitance can be determined to an accuracy of 0.1 pF or better, depending upon the number of resolvable, standard resistance values employed and the range of offset correction needed.

A blocking capacitor $C_{block}$ should be used in DC probes to allow accurate measurement of $R_{signature}$ when $R_{leak}$ is significant. $C_{block}$ provides DC isolation from the path formed by $R_{leak}$ and diode $D_2$ to ground. For AC probes, the use of $C_{block}$ is optional and will depend on overall system configuration, since measurement of $R_{signature}$ will not be affected by $R_{leak}$ unless line 11 is grounded accidentally. This condition may only happen, for example, if the overall system is configured with the center conductor 12 commonly tied to other $C_{probe}$ outputs, as may be the case in a multiplexed-drive, multiple-probe, single signal return system commonly seen on older aircraft. The value of $C_{block}$ is non-critical provided that a value is chosen that is many times higher than that of $C_{probe}$. The drift of $C_{probe}$ over temperature is negligible. With a $C_{probe}$ value of 50 pF "dry", a $C_{block}$ value of 100,000 pF that varies over temperature by 1% (1000 pF) will only change the series capacitance of $C_{block}+C_{probe}$ by 0.0005% a negligible amount. The initial tolerance of $C_{probe}$ does not affect trim accuracy. Since the initial measurement of the raw manufactured probe capacitance includes the initial tolerance offset of $C_{block}$, e.g., $C_{block}$ has an initial manufacturing tolerance of +/−5.0%, the effects from $C_{block}$ will be automatically included when the selection of $R_{signature}$ is made.

It has been an industry paradigm in the case of DC FHC probes that a physical series capacitor ($C_{fhc}$) is expected to be only 2.5 times the value of $C_{probe}$, forcing $C_{fhc}$ to be a high-precision precision component. In applying the present invention to DC or AC FHC probes, the $C_{fhc}$ capacitor is replaced with a non-critical DC-blocking capacitor $C_{block}$ that is typically at least 100 times or more greater in value than $C_{probe}$, and then uses a software-modeled FHC algorithm and the value of $R_{signature}$ to provide accurate, real-time calibration of the probe. The software for the FHC algorithm, as well as for the lookup table noted above, may be included in the measurement electronics 30. The particular code for the described functions will be straightforward and readily producable, in various forms adapted to the particular electronic system used, by those of skill in the art given the functions to be achieved.

A system including a method and means for providing an accurate, permanent calibration of capacitive-type fuel probes has been described which utilizes a fixed, standard-value signature resistor and has application to any probe wherein a series-blocking capacitor is used.

What is claimed is:

1. A liquid level measuring arrangement comprising:

a capacitive liquid level probe disposable in a liquid for measuring the level thereof and generating a probe output signal in response to an input signal;

a signal source connected to one side of the probe for applying the input signal to the probe;

signal measuring apparatus connected to another side of the probe for generating an output signal indicative of probe capacitance and comprising a look-up table of capacitance values; and a signature resistor connected in parallel with said probe and having a predetermined resistance value;

the signal measuring apparatus operative to measure the predetermined value of the signature resistor and to use the predetermined value as a pointer to the look-up table to thereby obtain an associated capacitance value from the look-up table and further operative to compute a liquid level output value on the basis of the output signal indicative of probe capacitance and the capacitance value obtained from the look-up table.

2. The liquid level measuring arrangement in accordance with claim 1 wherein the predetermined resistance value is correlated to a calibration offset value by which probe capacitance varies from a probe capacitance measurement value and wherein the liquid level output value is computed by mathametically combining the calibration offset value and the probe capacitance measurement value.

* * * * *